(12) United States Patent
Lee et al.

(10) Patent No.: US 10,762,925 B2
(45) Date of Patent: Sep. 1, 2020

(54) MAGNETIC GRAPHENE

(71) Applicant: The Government of the United States of America, as represented by the Secretary of the Navy, Washington, DC (US)

(72) Inventors: Woo K. Lee, Washington, DC (US); Keith E. Whitener, Washington, DC (US); Paul E. Sheehan, Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 21 days.

(21) Appl. No.: 16/156,934

(22) Filed: Oct. 10, 2018

(65) Prior Publication Data

US 2019/0088279 A1    Mar. 21, 2019

Related U.S. Application Data

(62) Division of application No. 14/918,328, filed on Oct. 20, 2015, now Pat. No. 10,134,434.

(60) Provisional application No. 62/079,851, filed on Nov. 14, 2014.

(51) Int. Cl.
    *G11B 5/84*    (2006.01)
    *B05D 5/00*    (2006.01)
    *C01B 32/184*    (2017.01)
    *H01F 1/42*    (2006.01)
    *G11B 5/65*    (2006.01)

(52) U.S. Cl.
    CPC .................. *G11B 5/84* (2013.01); *B05D 5/00* (2013.01); *C01B 32/184* (2017.08); *G11B 5/65* (2013.01); *H01F 1/42* (2013.01)

(58) Field of Classification Search
    CPC ........................................................ H01F 1/42
    USPC ...................................................... 428/195.1
    See application file for complete search history.

(56) References Cited

PUBLICATIONS

Wang et al., "Room-Temperature Ferromagnetism of Graphene," Nano Letters, 2009, vol. 9, No. 1, 220-224 (Year: 2009).*
Becerril et al., "Evaluation of Solution-Processed Reduced Graphene Oxide Films as Transparent Conductors," ACS NANO, vol. 2, No. 3, 463-470, 2008. (Year: 2008).*

* cited by examiner

*Primary Examiner* — Ian A Rummel
(74) *Attorney, Agent, or Firm* — US Naval Research Laboratory; Stephen T. Hunnius

(57) ABSTRACT

A patterned magnetic graphene made from the steps of transferring or growing a graphene film on a substrate, functionalizing the graphene film, hydrogenating the graphene film and forming fully hydrogenated graphene, manipulating the extent of the hydrogen content by using an electron beam from a scanning electron microscope to selectively remove hydrogen, wherein the step of selectively removing hydrogen occurs under a vacuum, and forming areas of magnetic graphene and non-magnetic graphene. A ferromagnetic graphene film comprising film that has a thickness of less than two atom layers thick.

8 Claims, 3 Drawing Sheets

MAGNETIC GRAPHENE

This application claims priority to and the benefits of U.S. patent application Ser. No. 14/918,328 filed on Oct. 20, 2015 and U.S. Patent Application No. 62/079,851 filed on Nov. 14, 2014, the entirety of each is herein incorporated by reference.

BACKGROUND

Magnetic thin films are deposited for a wide range of applications from magnetic storage to spintronics in order to build smaller and faster nanoscale devices. For example, the magnetic data storage and magneto-electronics industries demand sub-micrometer magnetic structures to operate devices in the gigahertz regime. In addition, as data storage densities grow, industries will require novel magnetic materials that can be patterned rapidly and in a scalable manner.

This disclosure describes how an arbitrary surface may be enhanced with patterned regions of ferromagnetism.

Specifically, a surface may be coated with hydrogenated graphene (HG) and the extent of the magnetism controlled by manipulating the extent of the hydrogen coverage. This can produce films with at least two potential functionalities: ferromagnetic and non-ferromagnetic domains on partially-hydrogenated graphene (pHG). Only partially hydrogenated graphene is ferromagnetic. Both highly HG and graphene are non-magnetic (i.e., diamagnetic).

For 40 years, magnetic hard drive disks (HDDs) enjoyed a growth rate in storage capacity of roughly 50% per year, improving by a factor of 50 million from roughly 2 kbit/in$^2$ in 1956 to around 100 Gbit/in$^2$ in 2006. However, in the past decade, this annual growth rate has slowed from 50% to about 10%. The primary reason for this deceleration is that current HDD technologies are nearing the physical limit of areal density of magnetic domains; that is, magnetic domains of currently used materials cannot be made much smaller than the state-of-the-art 25×250 nm domain size. Thus, the development of new materials capable of supporting precise placement of sub-micrometer magnetic domains is of central importance in advancing modern data storage technology.

Over the last decade, graphene and graphene-based materials have attracted a great deal of attention due to their unique properties, including high mechanical strength, excellent electrical and thermal conductivities, and chemical stability.

Among materials derived from graphene, chemically-modified graphenes (CMGs) show promise for flexible tuning of surface properties. Hydrogenated graphene (HG) is a CMG in which hydrogen atoms are covalently bonded to the basal plane of graphene. The extent of hydrogenation determines the properties of HG and therefore admits a convenient chemical dial for tuning these properties. For example, when graphene is fully hydrogenated, it is a wide-band-gap insulating material. More importantly for the purposes of magnetic storage, partially hydrogenated graphene (pHG) exhibits ferromagnetism, a property which is observed neither in HG nor in pristine graphene.

Here it has been demonstrated that hydrogen atoms can be removed efficiently from graphene by heat, by pressure, or by electron beam to recover its original characteristics. This enables the use of pHG as a host material for patterning a surface with magnetic and non-magnetic regions.

The use of pHG as a patterning host surface has not been realized until now. This invention concerns a method of preparing uniform and stable pHG, combined with an e-beam dehydrogenation (i.e., removal of hydrogen atoms) technique. By using the e-beam to selectively remove hydrogen atoms from certain areas of pHG, arrays of magnetic pHG and non-magnetic graphene patterns are fabricated. Other methods for patterning the hydrogen content can be utilized. Such patterned surfaces can find use in particular in high density data storage application.

SUMMARY OF THE INVENTION

A method of making magnetic graphene comprising transferring or growing a graphene film on a substrate, functionalizing the graphene film, hydrogenating the graphene film and forming fully hydrogenated graphene, manipulating the extent of the hydrogen content, and forming areas of magnetic graphene and non-magnetic graphene. A ferromagnetic graphene film comprising film that has a thickness of less than two atom layers thick.

This disclosure describes how an arbitrary surface may be enhanced with patterned regions of ferromagnetism.

Specifically, a surface may be coated with hydrogenated graphene (HG) and the extent of the magnetism controlled by manipulating the extent of the hydrogen coverage. This can produce films with at least two potential functionalities: ferromagnetic and non-ferromagnetic domains on partially-hydrogenated graphene (pHG). Only partially hydrogenated graphene is ferromagnetic. Both highly HG and graphene are non-magnetic (i.e., diamagnetic).

DETAILED DESCRIPTION

Figure 1:
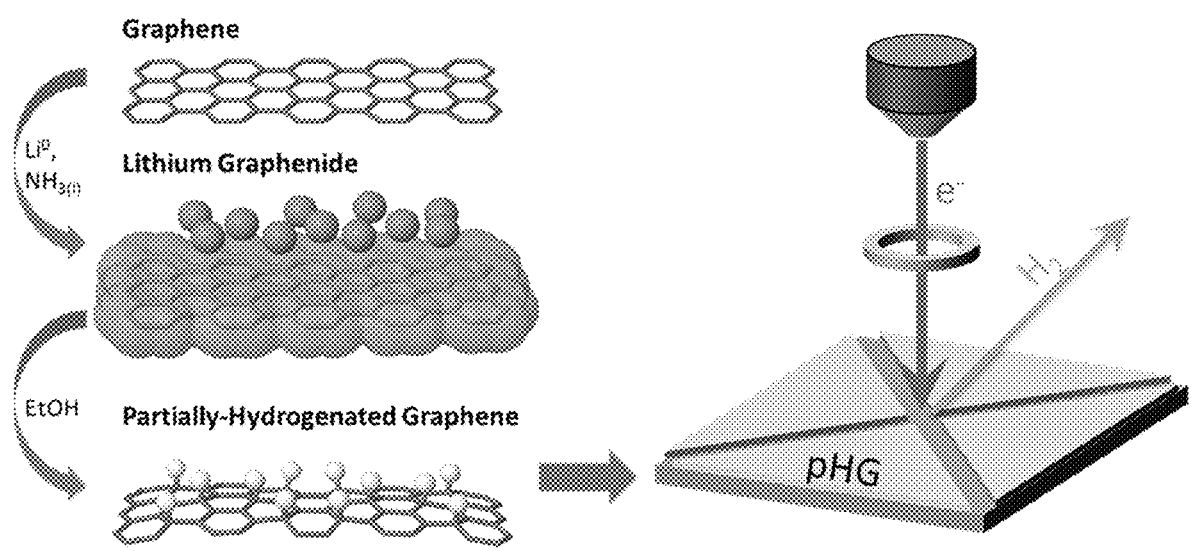
FIG. 1 illustrates a schematic of Birch reduction and illustrates electron beam dehydrogenation of pHG.

A method of making magnetic graphene comprising transferring or growing a graphene film on a substrate, functionalizing the graphene film, hydrogenating the graphene film and forming fully hydrogenated graphene, manipulating the extent of the hydrogen content, and forming areas of magnetic graphene and non-magnetic graphene. A ferromagnetic graphene film comprising film that has a thickness of less than two atom layers thick.

Here it has been demonstrated that hydrogen atoms can be removed efficiently from graphene by heat, by pressure, or by electron beam to recover its original characteristics. This enables the use of pHG as a host material for patterning a surface with magnetic and non-magnetic regions. Electron beam (e-beam) lithography can break chemical bonds of CMGs.

The use of pHG as a patterning host surface has not been realized until now. This invention concerns a method of preparing uniform and stable pHG, combined with an e-beam dehydrogenation (i.e. removal of hydrogen atoms) technique. By using the e-beam to selectively remove hydrogen atoms from certain areas of pHG, arrays of magnetic pHG and non-magnetic graphene patterns can be fabricated. Other methods for patterning the hydrogen content can be utilized. Such patterned surfaces can find use in particular in high density data storage application.

The generic approach requires the formation of hydrogenated graphene on the desired substrate. This may be achieved either by transferring graphene onto the desired substrate and then functionalizing it or by transferring a previously functionalized film onto the desired substrate. If a patterned magnetic film is desired, it can be either patterned before transfer or patterned after transfer if, for instance, precise registry with existing features is required.

Example 1

Graphene was transferred onto a technologically relevant substrate, $SiO_2$, and functionalized in place.

A CVD-grown single layer graphene film transferred onto $SiO_x$/Si was placed in a $N_2$-flushed vessel into which 10 mL of anhydrous liquid ammonia was distilled using a dry ice bath.

Approximately 50 mL of lithium wire was added in pieces to the vessel, and the mixture was allowed to react for different durations depending on the desired degree of hydrogenation: 5 to 30 seconds for pHG, and 2 minutes for fully hydrogenated graphene.

The reaction was then quenched with an alcoholic proton donor (methanol, ethanol, or isopropanol) and the devices were washed with additional alcohol and dried under a stream of $N_2$. The sheet resistance of pHG was controlled at an average of ~150 K$\Omega$/□.

Hydrogen was then selectively removed with the electron beam from a scanning electron microscope (SEM) under a mild vacuum (P ~$1.0\times10^{-6}$ Torr).

The pHG was imaged with low magnification (up to 5000× at 5.0 kV), which did not affect the electronic and magnetic properties of HG. Using reduced raster scan in the SEM software, selected areas were exposed on pHG sheets to electrons.

Example 2

Figure 2:
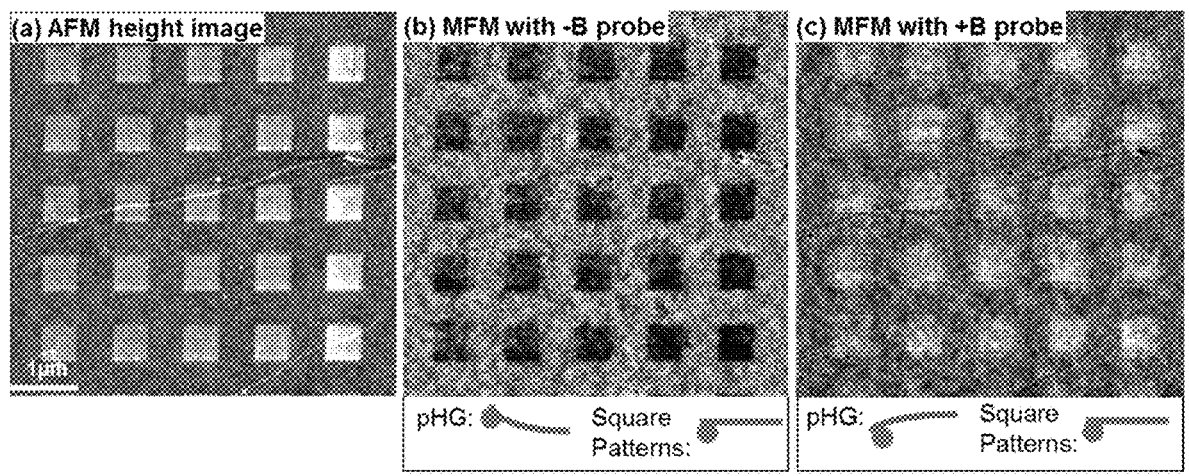
FIG. 2 illustrates MFM characterization of patterned pHG surface by electron beam dehydrogenation patterning.

The magnetic properties of the pHG and e-beam dehydrogenated area could be characterized by magnetic force microscopy (MFM), which uses a magnetized cantilever to detect long-range magnetic forces between the cantilever and surface. On the first pass, the topography of the surface was imaged in tapping mode; on the second pass, the cantilever was raised to a set height (40 nm) above the surface to detect the magnetic response. The magnetic cantilever can be oriented with either the north pole (+B) or the south pole (−B) pointing toward the surface. FIG. 2 shows the topography image of patterned features obtained by tapping mode in the first pass. While the e-beam removes hydrogen atoms from pHG, carbonaceous contamination from SEM chamber that is neither magnetic nor conductive was also deposited on the e-beam irradiated features.

FIG. 2 shows the magnetic responses of pHG for e-beam dehydrogenated features with (−B) and (+B) orientations, respectively. The e-beam dehydrogenated features displayed negative (darker) phase shift against a background of pHG, while these features displayed a positive phase shift (brighter) with the opposite magnetization used in FIG. 2. The phase shifts indicate that pHG responded to the cantilever's magnetic field but the e-beam irradiated lines did not. The insets in FIG. 2 help the understanding of the magnetic response of the cantilever with tip polarization.

In brief, the magnetized cantilever is bent (upward or downward) when it is above magnetic pHG due to the magnetic force between the tip and the surface, while the cantilever recovers the original state above the patterns of non-magnetic squares. Therefore, this observation indicates that the e-beam dehydrogenation of the pHG quenched its magnetic properties. Notably, the phase shifts were opposite with the south (FIG. 2) and north (FIG. 2) poled cantilevers, suggesting that pHG displays ferromagnetism at room temperature.

Figure 3:
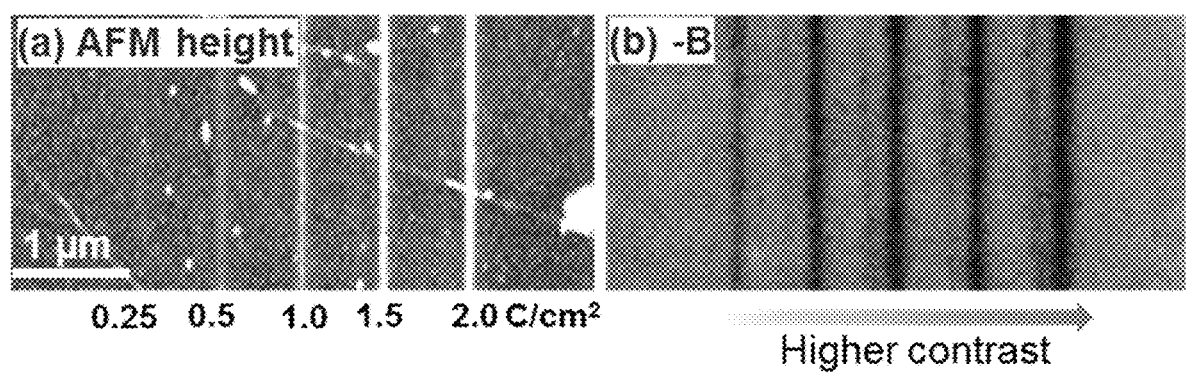
FIG. 3 illustrates magnetic gradient patterned with different e-beam doses.

In FIG. 3, the electron doses of the lines increase from 0.25 to 2.0 C/$cm^2$ leading to more pronounced MFM signal shifts (darker contrast). Elimination of magnetism begins to plateau by 0.25 C/$cm^2$. This shows that the ferromagnetism of the e-beam dehydrogenated lines was gradually quenched to fall into the plateau around the dose of 1.5 C/$cm^2$. This technique could be used to generate alternating patterns with different magnetic strengths on single pHG sheet without additional materials or processes.

This approach provides for a highly uniform ferromagnetic film that appears not to have grain boundaries. The film can be placed on a wide range of substrates. The film is ultra-thin, being on average less than two atom layers thick. The strength of the ferromagnetism can be controlled by the extent of the coverage of hydrogen.

By locally controlling the extent of hydrogenation, the film can be readily patterned. Patterning can be achieved, at a minimum, by using heat, electron beam desorption, chemically, mechanical stress, and light, or other methods of disassociating the hydrogen.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A patterned magnetic graphene made from the steps of:
   transferring or growing a graphene film on a substrate;
   functionalizing the graphene film;
   hydrogenating the graphene film and forming fully hydrogenated graphene; manipulating the extent of the hydrogen content by using an electron beam from a scanning electron microscope to selectively remove hydrogen, wherein the step of selectively removing hydrogen occurs under a vacuum; and
   forming areas of magnetic graphene and non-magnetic graphene.

2. The patterned magnetic graphene of claim 1, wherein the step of forming areas of magnetic graphene and non-magnetic graphene comprise the steps of forming an area of fully hydrogenated graphene, forming an area of partially hydrogenated graphene, and forming an area of graphene.

3. The patterned magnetic graphene of claim 2, wherein the area of highly hydrogenated graphene is non-magnetic and the area of graphene is non-magnetic and the area of partially hydrogenated graphene is magnetic.

4. The patterned magnetic graphene of claim 1 wherein the step of manipulating the extent of the hydrogen content comprises using heat or pressure.

5. The patterned magnetic graphene of claim 1 wherein the step of hydrogenating the graphene film comprises reacting the graphene film with anhydrous liquid ammonia and lithium.

6. The patterned magnetic graphene of claim 5 wherein the graphene film reacts with the anhydrous liquid ammonia and lithium for about 5 to about 2 minutes.

7. A uniform ferromagnetic graphene film comprising film that has a thickness of less than two atom layers thick wherein the graphene film is patterned by locally controlling the extent of hydrogenation and wherein the pattern is achieved by an electron beam.

8. The uniform ferromagnetic graphene film of claim 7 wherein the strength of the ferromagnetism is controlled by the extent of the coverage of the hydrogen.

* * * * *